United States Patent

Ogawa

[11] Patent Number: 5,844,035
[45] Date of Patent: Dec. 1, 1998

[54] GLASS FIBER-REINFORCED POLYSTYRENE RESIN COMPOSITION

[75] Inventor: Hiroyoshi Ogawa, Osaka, Japan

[73] Assignee: Daicel Chemical Industries, Ltd., Osaka, Japan

[21] Appl. No.: 803,925

[22] Filed: Feb. 21, 1997

[30] Foreign Application Priority Data

Feb. 21, 1996 [JP] Japan ................................. 8-060112

[51] Int. Cl.$^6$ ........................................................ C08K 3/00
[52] U.S. Cl. ........................................................... 524/494
[58] Field of Search ............................................. 524/494

[56] References Cited

U.S. PATENT DOCUMENTS

| | | | |
|---|---|---|---|
| 4,097,448 | 6/1978 | Heilman et al. | 260/42.18 |
| 5,082,892 | 1/1992 | Miura et al. | 524/516 |
| 5,436,397 | 7/1995 | Okada | 524/494 |

FOREIGN PATENT DOCUMENTS

| | | |
|---|---|---|
| 48-37450 | 6/1973 | Japan . |
| 49-24980 | 6/1974 | Japan . |
| 50-64343 | 5/1975 | Japan . |
| 59-86649 | 5/1984 | Japan . |

*Primary Examiner*—Edward J. Cain
*Attorney, Agent, or Firm*—Birch, Stewart, Kolasch & Birch, LLP

[57] ABSTRACT

The present invention provides a glass fiber-reinforced polystyrene resin composition in which an interfacial adhesion (affinity and wetting) of the polystyrene resin to the glass fiber is increased.

The glass fiber-reinforced polystyrene resin composition comprises a resin composition obtained by adding 0.1 to 50 parts by weight of a styrene resin (II) containing an epoxy group to 100 parts by weight of a polystyrene resin (I) as a base resin.

7 Claims, 1 Drawing Sheet

GLASS FIBER-REINFORCED POLYSTYRENE RESIN COMPOSITION

FIELD OF THE INVENTION

The present invention relates to a glass fiber-reinforced polystyrene resin composition intended for enhancing an interfacial adhesion (affinity and wetting) of glass fiber to polystyrene resins.

DESCRIPTION OF THE RELATED ART

In glass fiber-reinforced polystyrene resins, various investigations have so far been made in order to enhance an adhesion of the glass fibers to the polystyrene resins. Available are a method in which an interfacial adhesion to polystyrene resin is elevated by reacting a styrene monomer on a surface of glass beads as is the case with, for example, JP-B 49-24980 and a method in which glass fibers are introduced in polymerizing a styrene monomer as is the case with JP-A 50-64343, but such methods are not practical. Further, available are a method in which an adhesion to glass fibers is raised by polystyrene resins containing acrylic acid and maleic acid as disclosed in JP-A 48-37450 and a method in which the adhesion is raised by using a polystyrene resin containing unsaturated dicarboxylic anhydride and glass fibers treated with an epoxy base sizing agent as disclosed in JP-A 59-86649. However, while the physical properties have been improved, there is still room left for improving an adhesion of polystyrene resins to glass fibers.

There has been desired means for improving an interfacial adhesion of these polystyrene resins to glass fibers and further enhancing the physical properties.

SUMMARY OF THE INVENTION

Intensive investigation made by the present inventors in order to solve such problems of conventional techniques as described above have resulted in finding that an interfacial adhesion of a polystyrene resin to glass fibers is improved by adding a styrene resin (II) containing an epoxy group to a polystyrene resin (I) which is a base resin.

Figure 1:
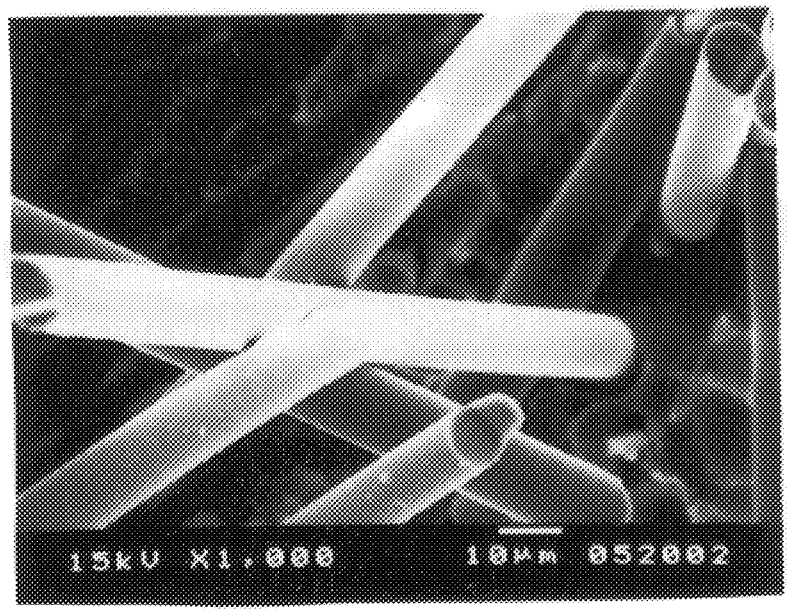
FIG. 1 is an SEM photograph (420 magnifications) of a cut surface of the glass fiber-reinforced polystyrene resin composition prepared in Example 7.

A broken-out section of a glass fiber-reinforced polystyrene resin composition using a resin composition obtained by adding a styrene resin containing an epoxy group to a polystyrene resin as a base resin has been observed to surprisingly find that the resin is adhered well closely to the glass fiber as shown in FIG. 1.

This is considered due to the fact that the adhesion has been improved by reacting an epoxy group contained in the base resin with a sizing agent or a coupling agent used for treating the glass fibers.

Figure 2:
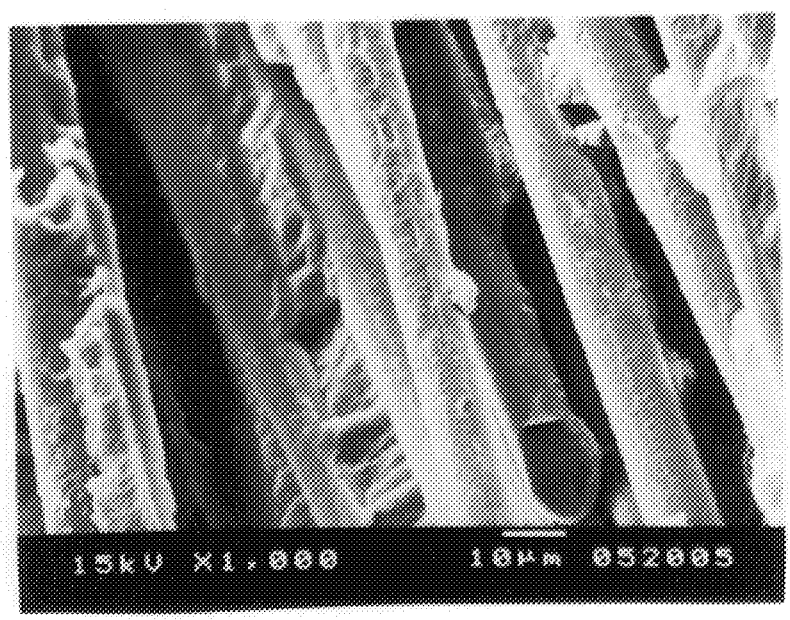
FIG. 2 is a SEM photograph (210 magnifications) of a cut surface of the glass fiber-reinforced polystyrene resin composition prepared in Comparative Example 3.

On the other hand, it can be found that a broken-out section of a glass fiber-reinforced polystyrene resin composition to which the styrene resin containing an epoxy group is not added has a smooth glass fiber surface and is inferior in an adhesion of the glass fiber to the resin as shown in FIG. 2.

The present invention relates to a glass fiber-reinforced polystyrene resin composition characterized by using a resin composition obtained by adding 0.1 to 50 parts by weight of a styrene resin (II) containing an epoxy group to 100 parts by weight of a polystyrene resin (I) as a base resin.

Further, the present inventors have found that an epoxy-modified block polymer (A) obtained by epoxidizing a part of double bonds of unsaturated carbons of the conjugate diene compound contained in a block copolymer (a) comprising a styrene resin polymer block and a polymer block comprising mainly a conjugate diene compound is readily available as the styrene resin (II) containing an epoxy group and that an interfacial adhesion of the polystyrene resin to the glass fibers is best improved, and thus, the inventors have come to complete the present invention.

The present invention relates to a glass fiber-reinforced polystyrene resin composition characterized by using a resin composition obtained by adding 0.1 to 50 parts by weight of the epoxy-modified block polymer (A) obtained by epoxidizing a part of double bonds of unsaturated carbons of the conjugate diene compound contained in the block copolymer (a) comprising the styrene resin polymer block and the polymer block comprising mainly the conjugate diene compound to 100 parts by weight of the polystyrene resin (I) as a base resin.

Further, the present inventors have found that the glass fiber-reinforced polystyrene resin composition in the present invention displays the effects thereof as well in a long glass fiber-reinforced polystyrene resin composition which is produced by a pultrusion method and in which the glass fibers are oriented substantially in parallel to the longitudinal direction of pellets.

That is, the present invention relates to a long glass fiber-reinforced polystyrene resin composition which is produced by a pultrusion method and in which the long glass fibers are oriented substantially in parallel to the longitudinal direction of pellets, characterized by using a resin composition obtained by adding 0.1 to 50 parts by weight of the styrene resin (II) modified with an epoxy group to 100 parts by weight of the polystyrene resin (I) as a base resin.

In other words, the composition comprises (I), (II) and glass fiber.

In the present invention, the glass fiber-reinforced polystyrene resin composition and a molding thereof in which an adhesion (affinity and wetting) of the polystyrene resin to the glass fiber is increased and which are improved in tensile, flexural and impact strengths as compared with those of conventional products can be obtained.

DETAILED DESCRIPTION OF THE INVENTION

The present invention shall be explained in further detail.

Any resin can be used as the polystyrene resin (I) used in the present invention as long as it is a known polystyrene resin or alloy resin with other thermoplastic resins containing at least one polystyrene resin.

The polystyrene resin includes, for example, general purpose polystyrene resins (GPPS), high impact polystyrene resins (HIPS), acrylonitrile-styrene copolymer resins (SAN resins), and acrylonitrile-butadiene-styrene copolymer resins (ABS resins).

Other thermoplastic resins which form the alloy resins in combination with polystyrene resins include, for example, polyolefin resins such as polyethylene, polypropylene and poly(ethylene-vinyl acetate), thermoplastic aromatic polyester resins such as polyethylene terephthalate and polybutylene terephthalate, polyamide resins such as 6-nylon,, 6,6-nylon, 4,6-nylon, 11-nylon, 12-nylon, and partially aromatic nylon, polycarbonate resins, polyacryl resins such as polymethyl methacrylate and polyethylene acrylate, polyether resins such as polyacetal and polyphenyl ether, and super engineering plastics such as polyphenyl sulfide and polyether ether ketone. When they are used as alloy resins, known plasticizers for raising compatibility and other known suitable additives may be added.

The styrene resin (II) containing an epoxy group used in the present invention includes an epoxy-modified block polymer (A) obtained by epoxidizing a part of double bonds of unsaturated carbons of the conjugate diene compound contained in a block copolymer (a) comprising a styrene resin polymer block and a polymer block comprising mainly a conjugate diene compound. When the epoxy-modified block polymer (A) is used, various sizing agents and coupling agents can be used as a sizing agent or a coupling agent for the resin applied on the glass fibers. At least one sizing agent selected from urethane base, epoxy base and acryl base agents is preferably used in combination with at least one coupling agent selected from aminosilane base, epoxysilane base, acrylsilane base and vinylsilane base agents since they are reacted well with the epoxy group contained in the epoxy-modified block polymer (A) and in particular, the interfacial adhesion is improved.

An addition amount of the epoxy-modified block polymer (A) falls in a range of 0.1 to 50 parts by weight per 100 parts by weight of the polystyrene resin which is the base resin. In particular, it is added preferably in a range of 1 to 15 parts by weight in terms of a balance of an interfacial adhesion with cost performance, mechanical characteristics and fluid characteristics.

The conjugate diene compound contained in the epoxy-modified block polymer (A) is at least one selected from, for example, butadiene, isoprene, 1,3-pentadiene, 2,3-dimethyl-1,3-butadiene, piperylene, 3-butyl-1,3-octadiene, and phenyl-1,3-butadiene. Among them, butadiene, isoprene and a combination thereof are preferred. In particular, styrene base triblock thermoplastic elastomers of polystyrene-polybutadiene-polystyrene (SBS) and polystyrene-polyisoprene-polystyrene (SIS), or block copolymers obtained by hydrogenating a part of double bonds of unsaturated carbons contained in the conjugate diene compounds thereof are more preferred as the block copolymer (a) since it's readily available and the heat stability is relatively good, and the processability as the thermoplastic resins is excellent.

In the block copolymer (a), the styrene resin polymer block and the polymer block comprising mainly the conjugate diene compound can be used in any ratio. In general, the higher the ratio of the styrene resin polymer block is, the more the hardness tends to increase. The higher the ratio of the polymer block comprising mainly the conjugate diene compound is, the more the impact strength tends to increase but the block copolymer (a) tends to be softened. A ratio of the styrene resin polymer block to the polymer block comprising mainly the conjugate diene compound can be selected preferably in a range of (20 to 80):(80 to 20).

The epoxy-modified block copolymer (A) used in the present invention is obtained by reacting the block copolymer (a) with an epoxidizing agent such as hydroperoxides and peracids in an inert solvent.

Hydroperoxides include, for example, hydrogen peroxide, tertiary butyl hydroperoxide and cumene peroxide. Peracids include, for example, performic acid, peracetic acid, perbenzoic acid and trifluoroperacetic acid. Among them, hydrogen peroxide and peracetic acid are the most preferred epoxidizing agents since they are industrially manufactured in large quantities and available at inexpensive costs, and the stabilities are relatively high.

In epoxidization, catalysts can be used if necessary. For example, in the case of peracids, alkalis such as sodium carbonate and acids such as sulfuric acid can be used as the catalyst. In the case of hydroperoxides, there can be used a mixture of tungstic acid and sodium hydroxide in combination with hydrogen peroxide, organic acids with hydrogen peroxide, or molybdenum hexacarbonyl with tertiary butyl hydroperoxide to obtain the catalyst effect.

An amount of the epoxidizing agent is not strictly restricted, and the optimum amounts in the respective cases are determined according to variable factors such as individual epoxidizing agents used, desired epoxidizing degrees and individual block copolymers used.

The inert solvent can be used for purposes such as a reduction in the material viscosity and the stabilization of the epoxidizing agents by dilution. In the case of peracetic acid, aromatic compounds, ethers and esters can be used. The particularly preferred solvents are hexane, cyclohexane, toluene, benzene, ethyl acetate, carbon tetrachloride, and chloroform. The epoxidization conditions are not strictly restricted. The usable reaction temperature range is determined according to a reactivity of the epoxidizing agents used. In the case of, for example, peracetic acid, a temperature range of 0° to 70° C. is preferred. Temperatures of less than 0° C. reduce the reaction rate, and temperatures exceeding 70° C. initiate the decomposition of peracetic acid. Further, in the case of a tertiary butyl hydroperoxide/molybdenum dioxide diacetylacetonate system, a temperature range of 20° to 150° C. is preferred because of the same reason. The reaction mixture does not have to be specifically treated and for example may be stirred for 2 to 10 hours. The resulting epoxy-modified copolymer can be isolated by suitable methods such as, for example, a method in which the copolymer is precipitated in a poor solvent, a method in which the copolymer is mixed with hot water while stirring to remove the solvent by distillation, and a direct solvent-removing method.

An epoxy equivalent of the epoxy-modified block polymer (A) used in the present invention is not specifically restricted and falls preferably in a range of 200 to 10000. The smaller epoxy equivalent is liable to cause gelation while raising the interfacial adhesion to the glass fibers, and too large epoxy equivalent rather deteriorates the interfacial adhesion.

Any glass fiber can be used for the glass fiber-reinforced polystyrene resin composition of the present invention as long as it is a glass fiber. In general, E-glass for reinforcing resins is readily available and used often for reinforcing resins.

A smaller diameter of the glass fiber is preferred since theoretically, the smaller the diameter is, the larger the surface area becomes. However, too small a diameter not only causes concern about influences to a human body such as sticking into the lungs, but also reduces the dispersibility of the glass fibers. Accordingly, the glass fibers having a diameter falling in a range of 10 to 20 μm is preferably used.

With respect to the form of the glass fibers which are used as raw material, used very often are chopped strands in the so-called short glass fiber-reinforced polystyrene resin, and roving in the case of a long glass fiber-reinforced polystyrene resin.

A content of the glass fibers falls in a range of 3 to 80% by weight based on the weight of the glass fiber-reinforced polystyrene resin composition. Too small a content of the glass fibers not only decreases a reinforcing effect but also exerts influences such as a reduction in an impact strength since the glass fibers act as a foreign matter. Meanwhile, too large a content of the glass fibers reduces the fluidity to lower the molding property. The high concentration glass fiber-reinforced resin can not be manufactured by compounding which is a general method for producing a short glass fiber-reinforced polystyrene resin. Accordingly, a glass fiber content of 5 to 50% by weight is preferred from a practical point of view.

In the present invention, the short glass fiber-reinforced polystyrene resin composition can be produced by mixing well the polystyrene resin, the styrene resin modified with an epoxy group, and the short glass fibers by means of various mixers (an extruder, a brabender, a kneader, a Banbury mixer, and the like). However, attention has to be paid since the effects of the invention are not sufficiently displayed in some cases if the respective resins are not dispersed in so good a state.

Further, in the present invention, the effects thereof are displayed as well in a long glass fiber-reinforced polystyrene resin composition which is produced by a pultrusion method and in which the glass fibers are oriented substantially parallel to the longitudinal direction of pellets.

The length of pellets produced from the long glass fiber-reinforced polystyrene resin falls preferably in a range of 3.0 to 50 mm, particularly preferably 5.0 to 30 mm. A length of the pellets falling in a shorter range than the above does not raise so much the impact strength which is a characteristic of long glass fiber-reinforced polystyrene. Meanwhile, the length falling in a longer range than the above not only increases the bulk density to deteriorate the transport efficiency when the pellets are packed in a bag but also offers the possibility of causing the problem of bridging that takes place in a hopper in a molding. An aspect ratio of the pellets produced from the long glass fiber-reinforced polystyrene resin is preferably 2 to 20.

Reinforcing materials (carbon fibers, aramide fibers, mica and the like), fillers (glass beads, calcium carbonate, aluminum hydroxide, aluminum oxide, talc, zeolite, ferrite and the like), colorants (carbon black, titanium white, red iron oxide and the like), flame retardants (hydroxides, TBA base, decabro base, antimony oxide, molybdenum oxide, phosphate esters and the like), and other additives known as functional additives can be added to the glass fiber-reinforced polystyrene resin of the present invention in suitable amounts.

The glass fiber-reinforced polystyrene resin compositions obtained in the present invention are improved in tensile and impact strength as compared to those of conventional products since the styrene resin containing an epoxy group is reacted with a sizing agent and a coupling agent used for the glass fibers, whereby an interfacial adhesion of the polystyrene resin to the glass fibers is improved.

EXAMPLES

The present invention shall specifically be described below with reference to examples, but the present invention shall not be restricted to these examples. "Parts" in the following examples represent "parts by weight".

Tensile strengths and Izod impact strengths in the examples and the comparative examples were determined in a room of 23° C. and 50% RH according to ASTM-D638 (⅛") and ASTM-D256 (¼" with a notch), respectively.

An epoxy equivalent of the epoxy-modified polymer synthesized was titrated with hydrobromic acid and calculated according to the following equation:

$$\text{Epoxy equivalent} = \frac{160{,}000 \times [\text{sample weight of epoxy-modified polymer (g)}]}{\text{titration amount of hydrobromic acid (ml)} \times \text{factor of hydrobromic acid}}$$

Example 1

A reactor equipped with a stirrer, a reflux condenser and a thermometer was charged with 300 g of a block copolymer of polystyrene-polybutadiene-polystyrene (TR 2000 manufactured by Japan Synthetic Rubber Co., ltd.) and 1500 g of ethyl acetate to dissolve them. Subsequently, 153 g of a 30 weight % ethyl acetate solution of peracetic acid was dropwise added continuously to carry out epoxidization at 40° C. for 3 hours while stirring. The reaction liquid was cooled down to room temperatures and taken out of the reactor. Then, a large quantity of methanol was added to precipitate a polymer, which was washed after filtering out and dried to obtain an epoxy-modified SBS polymer (A) having an epoxy equivalent of 520. Ten parts of the epoxy-modified SBS polymer (A) thus obtained, 100 parts of an HIPS resin (Daicel Styrol R60 manufactured by Daicel Chemical Ind. Co., Ltd.) and 10 parts of a chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 360 kgf/cm$^2$ and an Izod impact strength of 12 kgf·cm/cm. A broken surface of the test piece after the Izod impact test of this resin was observed by means of an SEM photograph to find that the resin was adhered well closely to the glass fibers.

Example 2

The epoxy-modified SBS polymer (B) having an epoxy equivalent of 1820 was obtained by the same production process as in Example 1, except that an addition amount of the ethyl acetate solution of peracetic acid was changed to 43 g. Ten parts of the epoxy-modified SBS polymer (B) thus obtained, 100 parts of the HIPS resin (Daicel Styrol R60 manufactured by Daicel Chemical Ind. Co., Ltd.) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 370 kgf/cm$^2$ and an Izod impact strength of 11 kgf·cm/cm. A broken surface of the test piece after the Izod impact test of this resin was observed by means of the SEM photograph to find that the resin was adhered well closely to the glass fibers.

Example 3

Five parts of the epoxy-modified SBS polymer (A), 5 parts of the SBS polymer (TR 2000 manufactured by Japan Synthetic Rubber Co., ltd.), 100 parts of the HIPS resin (Daicel Styrol R60 manufactured by Daicel Chemical Ind. Co., Ltd.) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 360 kgf/cm$^2$ and an Izod impact strength of 11 kgf·cm/cm. A broken surface of the test piece after the Izod impact test of this resin was observed by means of the SEM photograph to find that the resin was adhered well closely to the glass fibers.

Example 4

Hundred parts of the HIPS resin (Daicel Styrol R60 manufactured by Daicel Chemical Ind. Co., Ltd.), 2 parts of the epoxy-modified SBS polymer (A) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 380 kgf/cm$^2$ and an Izod impact strength of 8 kgf·cm/cm. A broken surface of the test piece after the Izod impact test of this resin was observed by means of the SEM photograph to find that the resin was adhered well closely to the glass fibers.

Comparative Example 1

Hundred and ten parts of the HIPS resin (Daicel Styrol R60 manufactured by Daicel Chemical Ind. Co., Ltd.) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 370 kgf/cm$^2$ and an Izod impact strength of 4 kgf·cm/cm. A broken surface of the test piece after the Izod impact test of this resin was observed by means of the SEM photograph to find that the resin was not adhered to the glass fibers, and the glass fibers remained in a smooth condition.

Comparative Example 2

Hundred parts of the HIPS resin (Daicel Styrol R60 manufactured by Daicel Chemical Ind. Co., Ltd.), 10 parts of a styrene-maleic anhydride copolymer resin (DYLARK 232 manufactured by Arco Chemical Japan Co., Ltd.) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 380 kgf/cm$^2$ and an Izod impact strength of 6 kgf·cm/cm. A broken surface of the test piece after the Izod impact test of this resin was observed by means of the SEM photograph to find that the resin was scarcely adhered to the glass fibers.

Example 5

Fifty parts of the HIPS resin (Daicel Styrol R60 manufactured by Daicel Chemical Ind. Co., Ltd.), 50 parts of a GPPS resin (Daicel Styrol 20 manufactured by Daicel Chemical Ind. Co., Ltd.), 3 parts of the epoxy-modified SBS polymer (A) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 400 kgf/cm$^2$ and an Izod impact strength of 8 kgf·cm/cm. A broken surface of the test piece after the Izod impact test of this resin was observed by means of the SEM photograph to find that the resin was adhered well closely to the glass fibers.

Example 6

Hundred parts of a SAN resin (Cevian-N10 manufactured by Daicel Chemical Ind. Co., Ltd.), 2 parts of the epoxy-modified SBS polymer (A), 2 parts of the SBS polymer (TR 2000 manufactured by Japan Synthetic Rubber Co., ltd.) and 10 parts of the chopped strand glass fiber (E Fiber manufactured by Nippon Denki Glass Co., Ltd.) were compounded and extruded to thereby produce short glass fiber-reinforced polystyrene resin pellets. This resin composition was molded by injection to prepare a test piece, which was measured for physical properties, having a tensile strength of 920 kgf/cm$^2$ and an Izod impact strength of 6 kgf·cm/cm. A broken surface of the test piece after the Izod impact test of this resin was observed by means of the SEM photograph to find that the resin was adhered well closely to the glass fibers.

Example 7

Long glass fiber-reinforced polystyrene pellets which had a glass concentration of 50% by weight and a pellet length of 10 mm and in which the glass fibers were oriented substantially in parallel to the longitudinal direction of the pellets were produced by a pultrusion method, wherein 50 parts of the HIPS resin (Daicel Styrol R60 manufactured by Daicel Chemical Ind. Co., Ltd.), 50 parts of the GPPS resin (Daicel Styrol 20 manufactured by Daicel Chemical Ind. Co., Ltd.) and 7 parts of the epoxy-modified SBS polymer (A) were used for a matrix resin, and glass roving (E Fiber manufactured by Nippon Denki Glass Co., Ltd.) was used for a reinforcing fiber. These pellets were molded by injection to prepare a test piece. This test piece was cut, and the cut surface was observed by means of the SEM photograph to find that the resin was adhered well closely to the glass fibers. The result is shown in FIG. 1.

Comparative Example 3

Long glass fiber-reinforced polystyrene pellets which had a glass concentration of 50% by weight and a pellet length of 10 mm and in which the glass fibers were oriented substantially in parallel to the longitudinal direction of the pellets were produced by a pultrusion method, wherein HIPS resin (Daicel Styrol R60 manufactured by Daicel Chemical Ind. Co., Ltd.) was used for a matrix resin, and glass roving (E Fiber manufactured by Nippon Denki Glass Co., Ltd.) was used for a reinforcing fiber. These pellets were molded by injection to prepare a test piece. This test piece was cut, and the cut surface was observed by means of the SEM photograph to find that the resin was not adhered to the glass fibers, and the glass fibers remained in a smooth condition. The result is shown in FIG. 2.

Example 8

Long glass fiber-reinforced polystyrene pellets which had a glass concentration of 50% by weight and a pellet length of 10 mm and in which the glass fibers were oriented substantially in parallel to the longitudinal direction of the pellets were produced by a pultrusion method, wherein 100 parts of the HIPS resin (Daicel Styrol R60 manufactured by Daicel Chemical Ind. Co., Ltd.) and 3 parts of the epoxy-modified SBS polymer (A) were used for a matrix resin, and glass roving (E Fiber using an aminosilane base coupling agent, manufactured by Nippon Denki Glass Co., Ltd.) was used for a reinforcing fiber. These pellets were molded by injection to prepare a test piece. This test piece was cut, and the cut surface was observed by means of the SEM photograph to find that the resin was adhered well closely to the glass fibers.

Example 9

An epoxy-modified SIS polymer (C) having an epoxy equivalent of 362 was obtained by the same production process as in Example 1, except that the raw material was changed to a block copolymer of polystyrene-polyisoprene-polystyrene (Califlex TR1111 manufactured by Shell Chemical Co., Ltd.), and an addition amount of the ethyl acetate solution of peracetic acid was changed to 222 g. Long glass fiber-reinforced polystyrene pellets which had a glass concentration of 50% by weight and a pellet length of 10 mm and in which the glass fibers were oriented substantially parallel to the longitudinal direction of the pellets were produced by a pultrusion method. Five parts of the epoxy-modified SIS polymer (C) thus obtained and 100 parts of the HIPS resin (Daicel Styrol R60 manufactured by Daicel Chemical Ind. Co., Ltd.) were used for a matrix resin. Glass roving (E Fiber using an aminosilane base coupling agent, manufactured by Nippon Denki Glass Co., Ltd.) was used for a reinforcing fiber. These pellets were molded by injection to prepare a test piece. This test piece was cut, and the cut surface was observed by means of the SEM photograph to find that the resin was adhered well closely to the glass fibers.

Example 10

Long glass fiber-reinforced polystyrene pellets which had a glass concentration of 50% by weight and a pellet length of 10 mm and in which the glass fibers were oriented substantially parallel to the longitudinal direction of the pellets were produced by a pultrusion method, wherein 100 parts of the SAN resin (Cevian-N10 manufactured by Daicel Chemical Ind. Co., Ltd.) and 5 parts of the epoxy-modified SBS polymer (A) were used for a matrix resin, and glass roving (E Fiber using an aminosilane base coupling agent, manufactured by Nippon Denki Glass Co., Ltd.) was used for a reinforcing fiber. These pellets were molded by injection to prepare a test piece. This test piece was cut, and the cut surface was observed by means of the SEM photograph to find that the resin was adhered well closely to the glass fibers.

What is claimed is:

1. A glass fiber-reinforced polystyrene resin composition comprising 100 parts by weight of a polystyrene resin (I), and 0.1 to 50 parts by weight of a styrene resin (II) containing an epoxy group and glass fiber.

2. The composition according to claim 1, wherein the polystyrene resin (I) is at least one selected from the group consisting of:

general purpose polystyrene resins (GPPS), high impact polystyrene resins (HIPS), acrylonitrile-styrene copolymer resins, acrylonitrile-butadiene-styrene copolymer resins, and alloy resins containing at least one of them with another thermoplastic resin.

3. The composition according to claim 1, wherein the styrene resin (II) containing an epoxy group is an epoxy-modified block polymer (A) obtained by epoxidizing a part of double bonds of unsaturated carbons of the conjugate diene compound contained in a block copolymer (a) comprising a styrene resin polymer block and a polymer block comprising mainly a conjugate diene compound.

4. The composition according to claim 3, wherein the block copolymer (a) is a styrene base triblock thermoplastic elastomer of polystyrene-polybutadiene-polystyrene or polystyrene-polyisoprene-polystyrene, or a block copolymer obtained by hydrogenating a part of double bonds of unsaturated carbons contained in the conjugate diene compounds thereof.

5. The composition according to claim 1, wherein the glass fiber-reinforced polystyrene resin composition is produced by a pultrusion method; the glass fibers are oriented substantially in parallel to the longitudinal direction of pellets; and the length of the pellet falls in a range of 3.0 to 50 mm.

6. The composition according to claim 2, wherein the styrene resin (II) containing an epoxy group is an epoxy-modified block polymer (A) obtained by epoxidizing a part of double bonds of unsaturated carbons of the conjugate diene compound contained in a block copolymer (a) comprising a styrene resin polymer block and a polymer block comprising mainly a conjugate diene compound.

7. The composition according to claims 2, 3, 4 or 6, wherein the glass fiber-reinforced polystyrene resin composition is produced by a pultrusion method; the glass fibers are oriented substantially in parallel to the longitudinal direction of pellets; and the length of the pellet falls in a range of 3.0 to 50 mm.

* * * * *